(12) United States Patent
Jaffee et al.

(10) Patent No.: US 8,084,378 B2
(45) Date of Patent: Dec. 27, 2011

(54) FIBER GLASS MAT, METHOD AND LAMINATE

(75) Inventors: Alan Michael Jaffee, Bowling Green, OH (US); Richard Emil Kajander, Plover, WI (US)

(73) Assignee: Johns Manville, Denver, CO (US)

( * ) Notice: Subject to any disclaimer, the term of this patent is extended or adjusted under 35 U.S.C. 154(b) by 256 days.

(21) Appl. No.: 12/429,276

(22) Filed: Apr. 24, 2009

(65) Prior Publication Data

US 2010/0273376 A1 Oct. 28, 2010

(51) Int. Cl.
*B32B 17/02* (2006.01)
*B32B 5/02* (2006.01)

(52) U.S. Cl. ......... 442/172; 442/176; 442/177; 442/180

(58) Field of Classification Search .................. 442/172, 442/176, 177, 180
See application file for complete search history.

(56) References Cited

U.S. PATENT DOCUMENTS

| | | | |
|---|---|---|---|
| 4,112,174 A | 9/1978 | Hannes et al. | |
| 4,129,674 A | 12/1978 | Hannes et al. | |
| 4,681,802 A | 7/1987 | Gaa et al. | |
| 4,810,576 A | 3/1989 | Gaa et al. | |
| 5,393,379 A | 2/1995 | Parrinello | |
| 5,484,653 A | 1/1996 | Kennedy et al. | |
| 5,565,049 A | 10/1996 | Simmons et al. | |
| 6,008,147 A | 12/1999 | Jaffee | |
| 6,187,697 B1 | 2/2001 | Jaffee et al. | |
| 6,391,131 B1 | 5/2002 | Newman et al. | |
| 6,579,413 B1 | 6/2003 | Grove | |
| 6,749,720 B2 | 6/2004 | Grove | |
| 6,770,354 B2 | 8/2004 | Randall et al. | |
| 6,808,793 B2 | 10/2004 | Randall et al. | |
| 6,875,308 B2 | 4/2005 | Kajander et al. | |
| 6,931,131 B1 | 8/2005 | Becker, Jr. et al. | |
| 6,995,098 B2 | 2/2006 | McGrady et al. | |
| 7,049,251 B2 | 5/2006 | Porter | |
| 7,199,065 B1 | 4/2007 | Groh et al. | |
| 7,250,381 B2 | 7/2007 | Jaffee | |
| 7,285,183 B2 | 10/2007 | Kajander et al. | |
| 7,297,396 B2 | 11/2007 | Wang et al. | |
| 7,354,876 B2 | 4/2008 | Porter et al. | |
| 7,426,259 B2 | 9/2008 | Weisfield | |
| 7,429,544 B2 | 9/2008 | Grove et al. | |
| 7,435,694 B2 | 10/2008 | Kajander | |
| 2002/0151240 A1 | 10/2002 | Smith et al. | |
| 2003/0129903 A1 | 7/2003 | Moes | |
| 2003/0175478 A1 | 9/2003 | Leclercq | |
| 2005/0202742 A1 | 9/2005 | Smith et al. | |
| 2008/0038971 A1* | 2/2008 | Tutin et al. | 442/59 |

\* cited by examiner

*Primary Examiner* — Norca L Torres Velazquez
(74) *Attorney, Agent, or Firm* — Robert D. Touslee

(57) ABSTRACT

Alkaline resistant fibrous products containing a binder comprised of a blend of urea formaldehyde and melamine formaldehyde and having particular use in bonding to alkaline materials having a pH of about 8 or above, including cementitious boards and other shapes, to provide manufacturing aids, reinforcement, fire resistance and a smooth surface are disclosed. Laminates containing one or more of the alkaline resistant fibrous products, with fibers bonded together with melamine formaldehyde and optionally a blend of urea formaldehyde and melamine formaldehyde binder, in contact with at least one cementitious layer are disclosed. Also, methods of making the alkaline resistant fibrous products and laminates that contain one or more layers of the alkaline resistant fibrous products are disclosed.

19 Claims, No Drawings

FIBER GLASS MAT, METHOD AND LAMINATE

The present invention involves alkaline resistant mats having particular use in bonding to alkaline materials having a pH of about 8 or above, including cementitious boards and other shapes, to provide manufacturing aids, reinforcement, fire resistance and a smooth surface, and laminates containing one or more of the alkaline resistant mats and a cementitious layer in contact with at least one alkaline resistant mat. The present invention also involves methods of making the alkaline resistant mats and laminates that contain one or more layers of the alkaline resistant mat. The mats produced according to this invention are useful as reinforcement and dimensional stabilizers for making a large number of inorganic and also laminate products having a foam layer, but are particularly useful when used in contact with an alkaline material layer having a pH of 8 or higher.

BACKGROUND

It is known to make various types of chopped or continuous glass fiber mats, with or without synthetic polymer fibers or other fibers. Woven or nonwoven fiber mats comprising glass fibers bonded together thermosetting resins, like urea formaldehyde, melamine formaldehyde resin or phenolic resole resins, acrylic resins, modified with one or more plasticizers or plain, as disclosed in U.S. Pat. No. 5,840,413, and to use various thermoplastic resins including polyvinyl acetate, polyvinyl alcohol, styrene-butadiene-rubber, styrene-butadiene-stryrene, styrene acrylic copolymers, polyvinyl chloride, flame retardant acrylics or brominated monomer additions to acrylic, usually applied as a latex. It is also known to use such mats in various roofing and foam facer applications, and to use some of these mats as facers for making cementitious boards like gypsum wallboard or backer board. In the latter application, the fibers in the mats are preferably bound with acrylic, phenolic or polyvinyl chloride based binders, but latex binders including ethylene-vinyl-chloride, polyvinyl acetate, ethylene vinyl versatate, polyvinylidene chloride, PVOH, polyester, SBR, urethane, silicone, melamines, ethylene-vinyl-acetate, metallic resonates, wax, asphalt, acrylic resins, styrene acrylate copolymers, aromatic isocyanates and diisocynates, organohydrogenpolysiloxanes, epoxies, phenolics, an acidulated water-soluble copolymer comprised of methacrylic acid and dimethyldiallyammonium chloride are also mentioned. Some binder mixtures such as a 70 wt. % urea formaldehyde resin with 30 wt. % acrylic latex mixture with a carboxylated polymer addition, ethylene/vinyl acetate and vinyl acetate/vinyl versatate copolymers are also disclosed. Such mats for use with cementations materials are disclosed in U.S. Pat. Nos. 6,770,354, 6,749,720, 6,808,793, 6,931,131, 6,995,098, 7,049,251, 7,297,396, 7,354,876, and 7,429.544, and published U.S. Pat. Application Nos. 2002/0151240 A1, 2003/0129903 A1, 2003/0175478 A1, and 2005/0202742 A1.

It is also known to make nonwoven fibrous mats containing polyether imide fibers and glass fibers bonded together with a melamine formaldehyde binder, as disclosed in U.S. Pat. No. 7,250,381, for use as a facer against a fiber reinforced thermoplastic and thermoformable layer. It is also known, as disclosed in U.S. Pat. Nos. 6,875,308 and 7,285,183, to make a facer for gypsum wall board by foam coating a wet laid glass fiber mat containing a cured binder such as urea formaldehyde resin, melamine formaldehyde resin or other resin binders. It is also known to make a roofing felt by needling synthetic polymer fibers into a nonwoven glass fiber mat containing a cured melamine formaldehyde binder as disclosed in U.S. Pat. No. 7,199,065, and to make a facer mat having good hiding power comprising glass fibers, a paper coating material and any known mat binder including melamine formaldehyde, the mats for use in making products like tack board, wall board, etc., see U.S. Pat. No. 7,435,694.

It is also known to make nonwoven fiber glass mats by chopping dry strands of glass fibers bound together with a binder to form chopped strand, to collect the chopped strand on a moving conveyor in a random pattern, and to bond the chopped strand together at their crossings by dusting a dry, powdered thermoplastic binder like a polyamide, polyester or ethylene vinyl acetate on wetted chopped strands followed by drying and curing the binder, as disclosed in U.S. Pat. No. 5,565,049. While such mat products are very useful including bonding to a layer of polymeric foam to stiffen the foam, these mats do not have as high a tensile strength as desired, and as achieved with a wet laid nonwoven fiber glass mat, because the bundles or chopped strands in the mat, according to the invention of the above cited patent, do not bond together as well as the individual fibers in a typical nonwoven mat. It is also known to use bundles of chopped strands, bundles of a plurality of fibers bonded together with a thermoplastic or thermoset binder, in a wet laid nonwoven mat as disclosed in U.S. Pat. No. 4,129,674.

It is also known to make a nonwoven fiber glass mat bonded with "B" staged acrylic resin having a glass transition temperature above 45 degrees C. and to use such mats to form a laminate with a foam layer for use in automotive head liners as disclosed in U.S. Pat. No. 6,008,147, but this mat is not well suited for laminating to a polymeric fibrous web when the desired shape contains complex curvatures requiring the mat to stretch substantially during molding. Further, it is known to use an acrylic copolymer latex, such as a self cross linking acrylic copolymer of an anionic emulsifying type as one component of at least a two component binder for bonding glass fibers and particulate thermoplastic to make a glass fiber reinforced sheet that can later be hot molded into various shapes and articles, as disclosed in U.S. Pat. No. 5,393,379.

What is still needed is a fibrous mat or facer having better alkaline resistance for use in contact with alkaline cementitious materials to provide laminates having superior alkaline resistance.

SUMMARY OF THE INVENTION

The invention is based on the surprising discovery of the superiority of the alkaline resistance, as determined by soaking in saturated calcium hydroxide solution at ambient room temperatures, of glass fiber mats bound together with a melamine formaldehyde binder or binders of blends of from about 1 to about 60 percent urea formaldehyde and from about 60 to about 99 percent melamine formaldehyde, with the total adding to 100 percent, based on the weight of the binder in the finished dry mats, compared with the same or similar mats in which the binder bonding the fibers together is an acrylic binder or acrylic binders modified with urea formaldehyde binder or melamine formaldehyde binder. This discovery results in improved glass fiber containing fabrics, mats and scrim products for use in contact with cementitious materials having a high pH, 8 or above, especially when wet, and to improved laminates containing a cementitious layer stabilized and strengthened with one or more of these glass fiber containing products.

The invention includes fibrous woven and/or nonwoven facer mats containing chopped and/or continuous glass fibers that are particularly suited for laminating to alkaline materials having a pH of about 8 or higher, and also to various other materials such as wood, a polymeric fiber web, fiber glass wool or mineral fiber webs or boards, foam boards, etc. glass fibers bound together with a latex binder, the binder containing melamine formaldehyde binder or a mixture or blend of urea formaldehyde binder and melamine formaldehyde binder with the melamine formaldehyde typically being present in the binder blend in the range of about 45 wt. percent to about 97.5 wt. percent on the basis of the cured binder in the dry mats. More typically the melamine formaldehyde is present in the binder blend in amounts of at least about 50 to about 90 or 95 wt. percent, most typically in amounts of about 55 or 60 to about 65 or 70 wt. percent. The invention also includes laminates including one or more of these mats and/or woven and/or nonwoven mats containing chopped and/or continuous glass fibers or yarns, the fibers in the mats bonded with melamine formaldehyde based binders, to a layer of alkaline cementitious material having and before curing of the cementitious material. All of these mats are particularly useful as facers against an alkaline material having a pH of about 7.5 or higher after curing and when wet, such as about 8 or higher, 8.5 or higher, and particularly about 10 or higher. These pH values are for wet cementitious material.

The invention also includes laminates comprised of the above woven and/or nonwoven mats and scrims, coated or uncoated, in which the fibers are bonded together with a binder containing melamine formaldehyde in amounts of about 60 to about 100 wt. percent and urea melamine formaldehyde present in amounts of about 60 to about 0 wt. percent, the total percentages amounting to 100 percent and based on the amount of binder in the dry mats or scrims, and in which an uncoated surface of the mat and/or scrim is in contact with a layer of cementitious material having a pH of at least about 7.5, more typically at least about 8 and most typically at least about 8.5 after curing of the cementitious material, but often having pH of at least about 10 when wet and before the wet cementitious material has hydraulically cured.

The invention also includes a method of making the woven or nonwoven mats described above comprising bonding and/or coating fibers comprising chopped and/or continuous glass fibers with a latex binder blend containing urea formaldehyde and melamine formaldehyde with the urea formaldehyde being present in the binder in the range of about 60 to about 1 wt. percent, on the basis of the cured binder in the dry mats, to protect the fibers and to produce alkaline resistant mats to use as facer sheets. Other ratios of UF to MF in the blend is described above in the alkaline resistant mats. In the method, the other binder blends disclosed for the products of the invention above are applicable. One particular embodiment of the method involves dispersing fibers comprising glass fibers in a conventional whitewater to make an aqueous slurry, collecting the dispersed fibers onto a moving permeable support to form a wet, fibrous, nonwoven mat, saturating the wet mat with a latex of the UF/MF blend binder, removing excess water and binder from the wet, nonwoven web and drying and heating the mat in a temperature and time environment that will cure the binder forming bonds where the fibers cross each other.

The present invention also includes a method of making laminates containing an alkaline material layer, particularly an alkaline material having a pH of about 8 or higher when wet, and one or more of the above described alkaline resistant mats or mats containing glass fibers and a latex binder containing melamine formaldehyde and a layer of alkaline material having a pH of about 8 or higher when wet. The alkaline material will more typically have a pH of about 8.5 or higher and often about 9 or higher and even about 10 or higher. The fibrous mats preferably can be a woven, nonwoven, wet laid, dry laid, spun bonded, melt-blown or a carded, lapped and needled web chopped and/or continuous glass fibers glass fiber with or without rovings or yarn and with or without chopped and/or continuous fibers of an organic polymer or natural fibers. The fibrous mats can also include woven and/or nonwoven scrims containing continuous fiber rovings or yarn and with or without chopped and/or continuous fibers of an organic polymer or natural fibers The mats of the present invention can also have bundles of incompletely dispersed fibers in which the fibers are preferably at least 0.75 inch long and most preferably at least 1 inch long. The mats of the invention and in the laminates can have a conventional coating on at least one surface to enhance the forming of a cementitious or foam layer against an uncoated surface of the mat in a known manner. The mats can also contain pigments, dyes, flame-retardants, and other additives so long as they do not significantly reduce the ability of the mat to bond to a cementitious or foam surface and do not significantly reduce the alkaline resistance of the mats. The pigments or other additives can be included in the binder if desired.

When the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF THE INVENTION

It is known to make reinforcing woven fabric and scrim, and nonwoven mats, scrim, all containing chopped and/or continuous glass fibers, with or without other fibers including synthetic polymer fibers, ceramic fibers including carbon fibers and natural fibers. The fibers are present in the form of chopped fibers, chopped fiber strands containing a cured binder, direct wound and assembled rovings, and yarn, and to use these fabrics, mats and scrims as, or in, substrates, coated or uncoated, and/or laminates in the manufacture of a large number of roofing and laminate products. Known methods of making nonwoven mats can be used, such as the conventional wet laid processes described in U.S. Pat. Nos. 4,129,674, 4,112,174, 4,681,802, 4,810,576, 5,484,653 and 6,187,697, the disclosures of each being hereby incorporated herein by reference. In these processes a slurry of glass fiber is made by adding chopped glass fibers, with or without chopped rovings comprising bundles of fibers bound with a cured binder, to a typical white water in a pulper to disperse the fibers in the white water, forming a slurry having a fiber concentration of about 0.2-1.0 weight percent, metering the slurry into a flow of white water to dilute the fiber concentration to about 0.18 wt. percent or below, and feeding this slurry onto a moving inclined screen forming wire to dewater and form a wet nonwoven fibrous web. Continuous fiber yarns can be added as the wet web is being formed, or just afterward, in a machine direction or in a sine wave pattern if desired as is known. After the wet fibrous web is partially dewatered by running over one or more suction boxes, the wet web is transferred to another moving permeable belt on which an aqueous binder is then applied to the mat, such as with a curtain coater, and the excess binder is removed by a vacuum knife and the resultant wet mat is dried in an oven by heating the mat to a temperature high enough to remove the water and cure the binder. Various pigments, fillers and/or other functional ingredients can be included in the whitewater slurry, or in the binder as disclosed in U.S. Pat. No. 6,187,697. These known processes, with modifications as will be described later, can be used to make the products of the present invention. Alternative forming methods for making the wet laid mats of the invention, modified to use the binders as disclosed herein, include the use of conventional paper or board making processes such as flat bed fourdrinier forming, cylinder forming, etc.

Conventional "dry laying" processes using carding, lapping or random fiber distribution, such as known processes for making chopped strand or chopped fiber mats can also be used for making chopped strand mats of the invention. Conventional processes for making continuous strand mats can be used the make the mats of the invention. Conventional scrim making processes can be used to make the scrims of the invention, modified to use the binders as disclosed herein.

The preferred technique for the making of mats of the present invention is forming a dilute aqueous slurry of fibers and depositing the slurry onto an inclined moving screen forming wire to dewater the slurry and form a wet nonwoven fibrous mat, on machines like inclined wire fourdrinier machines, Hydroformer™ manufactured by Voith-Sulzer of Appleton, Wash., or a Deltaformer™ manufactured by North County Engineers of Glens Falls, N.Y.

The slurry used in the above wet laid mat forming processes contains fibers, preferably glass fibers or mixtures of glass fibers and one or more other kind of fibers, with or without particles of pigment, filler or other functional material, with the glass fibers making up all or most of the fibers. The particle size of any particles in the slurry should be such that most, a majority to all of the particles will be entrapped in the mat during forming and not be migrated to a lower surface or washed out of the mat with the whitewater leaving the wet web.

Most any kind of chopped glass fibers, chopped strands of glass fibers bound with a cured binder, continuous glass fiber strands or yarn can be used in the invention, but preferably the glasses are known E glasses, AR glasses, R and/or S glasses. The length and diameter of the glass fibers in the chopped glass fibers and chopped glass fiber strands can be selected based on the intended application and desired properties, but for use in the laminates disclosed herein, the typical lengths of the glass fibers will be in the range of about 0.2 to about 3 inches long, more typically about 0.5 to about 2 inches and most typically about 0.7 to about 1.2 inches long. The diameter of the glass fibers in all of the glass fiber products used In the invention will typically have an average or nominal fiber diameter in the range of about 6 to about 23 microns, more typically in the range of about 9 to about 17 microns and most typically about 12 to about 16 microns. It is most typical that the glass fibers be coated with an amino or ureido silane containing size composition, which are well known and such glass fiber products are readily available from glass fiber manufacturers. The preferred fibers are M or K or H 137 and H, K or M 117 E glass fibers available from Johns Manville International, Inc. of Denver, Colo., but most any commercially wet chop glass fiber product will be suitable for making the wet laid mat products. While most typically all or a majority of the fibers in the fabrics, mats or scrim are glass fibers, a minor portion of non-glass fibers can also be used, such as man made or natural organic fibers like Nylon™, polyester, polyethylene, polypropylene, cellulosic fibers or fibers of cellulose derivatives, and ceramic fibers including carbon fibers.

The binders used in the mats contain either melamine formaldehyde or blends of urea formaldehyde (UF) and melamine formaldehyde (MF), normally as solutions, with or without other functional ingredients including cure catalysts plasticizers, antifoaming agents, dispersants, viscosity modifiers, biocides, flame retardants and pigments. Since urea formaldehyde binders are substantially less expensive than melamine formaldehyde binders, it is usually preferred to use as high a ratio of UF to MF as will produce the desired alkaline resistance in any particular laminate product. The suitable ranges of UF to MF ratios are given above in the Summary and in the Examples below. Some desired UF and MF binder products particularly useful in the invention include the following. Commercially available binders like Resi-Mat® 2928, an UF binder supplied by Georgia-Pacific Corp. of Atlanta, Ga., and Astromel CR-1, an MF binder supplied by Hexion Speciality Chemicals of Morgantown, N.C. are just two examples of many suitable commercially available binders for use in the invention.

In the wet laid processes, the wet nonwoven web of fibers is transferred to a second moving screen and run through a binder saturating station, preferably using a conventional curtain coater, where an aqueous melamine formaldehyde, or urea formaldehyde-melamine formaldehyde binder, with or without other functional ingredients, is applied to the mat in any one of several known ways. The saturated mat is then run over one or more suction knives in a known manner while still on the moving screen to remove excess aqueous binder. The other functional ingredients can include cure catalysts, plasticizers, antifoaming agents, dispersants, surfactants, viscosity modifiers, biocides, flame retardants, silanes, pigments and others.

The wet mat is then transferred to a wire mesh moving oven belt, or honeycomb type drum, and subjected to hot air to dry the wet bindered web and to cure the binder in the mat including the places where the fibers contact and/or cross one another in close proximity to bond the fibers together to form mats of the invention. Normally, the mat is subjected to a temperature in the range of about 250 to about 450 degrees F. for at least about 20 seconds to cure the binder(s).

When making fabrics and scrim containing assembled rovings and/or yarn, the cured binder in the continuous fiber strands bonding the fibers together is preferably melamine formaldehyde or a blend of urea formaldehyde and melamine formaldehyde in which the melamine formaldehyde is present in an amount of about 2.5 to about 99 wt. percent and the urea formaldehyde is present in amounts of about 97.5 to about 1 wt. percent, based on the weight of binder in the dry mats or scrims. If the binder bonding the fibers together in the roving strands is not as just described, than the fabric or scrim is subjected to an aqueous binder as described just above and heated to dry and cure the binder and to coat the rovings and lock the rovings together where they contact one another including those locations where they cross one another. This latter step is also used in making chopped strand mats by chopping assembled rovings and randomly placing the chopped strands onto a moving permeable belt followed by applying a binder and drying the mat and curing the binder.

The amount of binder in the mat is in the range of about 10 to about 35 wt. percent of the weight of the dry, uncoated mat, more typically in the range of about 15 to about 25 wt. percent and most typically in the range of about 17 to about 23 wt. percent such as a range of about 18 to about 21 wt. percent.

The basis weight of the fabrics, mats or scrim will depend upon the specific application. The basis weight can be decreased or increased, depending upon the desirable rigidity and strength of the laminate. Basis weights as low as 0.5 pounds per 100 square feet can be rolled up at the end of the mat machine and later cut and handled for use. The maximum weight would be determined by the capability of the mat forming process and/or the drying oven. Typically, for use in making laminates containing one or more layers of an alkaline material, the basis wt. would vary in the range of about 1 to about 5 lbs./100 sq. ft., more typically from about 1.4 to about 3 lbs./100 sq. ft. As the basis weight of the mat varies, other properties of the fabrics, mats and scrims of the invention and of the laminates using these fiber products, including the air and/or liquid permeability, the tensile and tear strengths, the hot wet tensile strength or retention, and the thickness will also vary and the particular nominal basis weight and/or other properties will be selected to satisfy the need of the particular laminate product being made and the application it for which the mat or laminate is intended.

Fibrous facers are used to make laminates largely because of the strength and stability such facers provide in the finished laminate product. Thus, one of the most important properties of the fabrics, mats and scrims, as used to make laminates in which they will be in contact with a layer of alkaline material, of the invention is the resistance to alkaline conditions, particularly to wet alkaline conditions including the percent tensile strength retention after exposure to alkaline solutions of high pH such as a 1% or higher solution of NaOH, saturated solutions of $Mg(OH)_2$ and $Ca(OH)_2$ at ambient, or elevated temperatures such as about 60 degrees C. for a period of time, such as 6 hours or longer for elevated temperature or 30 days, 90 days, and longer at room or ambient temperatures. One test of measuring alkaline resistance of the mats, fabrics and scrims is to soak the fabric or mat in the test solution at ambient, or elevated, temperature for the desired time and then to measure the strength, weight loss, or other characteristics and compare with untreated samples. Long term performance can be approximated by accelerating corrosion or dissolution by heating the test solution up to its boiling point throughout the test.

Since NaOH is usually not present to any significant amount in cementitious materials, which contain mostly calcium compounds and to a much lesser extent magnesium compounds, it is preferred to use aqueous $Ca(OH)_2$ solutions, and in some limited applications also aqueous $Mg(OH)_2$ solutions for the alkaline resistance tests.

The following examples disclose some of the embodiments of the invention and show the surprising alkaline resistance properties compared with some other typical binder types used in facer mats containing all or a majority of glass fibers. Wet laid mats are used in these examples to demonstrate the effect of the binder on the alkaline resistance of the mat and thus the suitability of the fibrous mats, fabrics and scrims for contact with cementitious materials having a high pH. All of the tensile strengths in the examples are measured in the machine direction of mat, i.e. in the direction the mat was oriented on the wet mat machine that formed the mats.

EXAMPLE 1

A fiber slurry was prepared by adding one inch long wet M 117 E type glass wet chopped fibers (16 micron nominal) from Johns Manville International, Inc. of Denver, Colo., having a silane containing chemical sizing on the surface, as is well known, to a known cationic white water containing Natrosol™ thickening agent available from Aqualon, Inc. of Wilmington, Del., and a cationic surfactant C-61, an ethoxylated tallow amine available from Cytec Industries, Inc. of Morristown, N.J., as a dispersing agent to form a fiber concentration of about 0.8 weight percent. After allowing the slurry to agitate for at least about 5 minutes to thoroughly disperse the fibers, the slurry was metered into a moving stream of the same whitewater to dilute the fiber concentration to a concentration averaging about 0.05 to 0.006 weight percent before pumping the diluted slurry to a headbox of a Voith Hydroformer™ where a wet nonwoven web was continuously formed in sufficient basis weight to produce a finished dry mat having a nominal basis weight of about 4.5 pounds per 100 square feet.

The wet web was continuously removed from the forming wire and transferred to an in-line Sandy Hill Curtain Coater where a melamine formaldehyde binder was applied in excess and the saturated web was then run over a vacuum knife which removed the excess and left a sufficient quantity in the mat to produce a concentration of in the dry mat of about 13 to about 24 wt. percent, nominally about 17-21 wt. percent. The aqueous MF binder contained 97.8 wt. percent of CR-1 melamine formaldehyde type binder, 1 wt. percent Ancel SI-1 catalyst form Hexion, 1.1 wt. percent Emerest 2646 surfactant from Pulcra Chemicals of Mauldin, S.C., and 0.1 wt. percent Y5823 silane from Momentive Performance Materials of Friendly, W. Va., the wt. percentages of the binder based on the weight of the binder after drying to remove the water.

The wet mat was then transferred to an oven belt and carried through an oven to dry the mat and to heat the wet mat to remove the water and then to a temperature of about 400 degrees F. for less than about 60 seconds to cure the MF resin binder, causing it to bond the fibers together. The resultant wet laid, dry nonwoven mat had the following properties.

Thickness (mils) - 80 nominal
Basis weight (lbs./100 sq. ft.) - 4.5
Loss on ignition - 18.5%
Tensile Strength - Machine direction (lbs/3 in.) - 130
Wet Tensile (lbs/3 in.) - 75 (After soaking in water for 10 min. at 180 degrees F.

| Tensile after soak in*: | Water Sat. | Ca(OH)2 | Sat. Mg(OH)2 | 1% NaOH |
|---|---|---|---|---|
| 30 days % retention: | 93 | 70 | 50 | 54 |
| 90 days % retention: | 74 | 53 | 35 | 31 |

*All at ambient room temperature.

This test data shows that the mat of this example would be suitable for use in laminates in which the mat is in contact with a layer of cementitious material.

EXAMPLE 2

This mat was made in the same manner as the mat in Example 1 except that the wet web was of sufficient thickness to produce a finished dry mat having a basis weight of only about 1.15 lbs./100 sq. ft. and the binder applied was a blend of 50 wt. percent of the Resi-Mat® 2928 UF type binder and 50 wt. percent of the MF type binder described above in Example 1. The dry finished mat had the following properties:

| Basis wt. - 1.15 lbs./100 sq. ft. nominal Loss on ignition (%) - 18.5 | | |
|---|---|---|
| Tensile retention after soak in: | Sat. Ca(OH)2 | 3% NaOH |
| 6 hours at 60 deg. C. - % retention: | 51 | 10 |

These data indicate that this mat would be suitable for use as a facer against cementitious materials in laminates.

EXAMPLE 3

A control wet laid nonwoven mat was made using the same procedure used in Example 1 except that the glass fibers were K 249 chopped wet glass fibers (13 micron nominal), the thickness of the wet fiber web was such as to produce a basis weight in the finished, dry mat of about 1.5 lbs./100 sq. ft. and the binder used was an acrylic type binder used in industry to bond glass fibers together in commercial nonwoven mats. The finished dry mat had the following properties.

| Thickness (mils) - 24 nominal Basis weight (lbs./100 sq. ft.) - 1.5 nominal Loss on ignition - 17% Tensile Strength - Machine direction (lbs/3 in.) - 87 Wet Tensile (lbs/3 in.) - 45 | | | | |
|---|---|---|---|---|
| Tensile after soak in*: | Water Sat. | Ca(OH)2 | Sat. Mg(OH)2 | 1% NaOH |
| 30 days % retention: | 86 | 44 | 15 | 4 |
| 90 days % retention: | 92 | 26 | 8 | 5 |

*All at ambient room temperature.

This data shows the alkali resistance of a glass fiber mat bound with an acrylic binder is substantially inferior to glass fiber mat bound with a melamine formaldehyde binder and indicates that the acrylic bound mat also has less alkali resistance than glass fiber mats bound with a blend of MF and UF binder.

EXAMPLE 4

Another control mat was made using the same procedure used in Example 1 except that K 117 glass fibers (13 micron nominal) were used, the wet web had a thickness sufficient to produce a basis weight in the finished dry mat of about 1.37 lbs./100 sq. ft. and the binder was a blend of a major portion of a commercially available acrylic binder and a minor portion of a commercially available MF binder used in industry to bond glass fibers together in a commercial nonwoven mat. The resultant dry finished mat had the following properties.

| Basis wt. - 1.37 lbs./100 sq. ft. Thickness (mils) - 23 nominal Loss on ignition (%) - 19 nominal Tensile strength (lbs./3 inch width) - 85 Air permeability (CFM/sq. ft.) - 710 average |
|---|

| Tensile after soak in*: | Water Sat. | Ca(OH)2 | Sat. Mg(OH)2 | 1% NaOH |
|---|---|---|---|---|
| 30 days % retention: | 58 | 43 | 65 | 2 |
| 90 days % retention: | 68 | 11 | 50 | 3 |

*All at ambient room temperature.

This data shows that a blend of an acrylic binder and a melamine formaldehyde binder produced glass fiber mats having less resistance to calcium hydroxide than the acrylic binder bound mats.

EXAMPLE 5

Another control mat was made using the same procedure used in Examples 1 except that the wet web had a thickness sufficient to produce a basis weight in the finished dry mat of about 4.8 lbs./100 sq. ft. and the binder was a blend of a major portion of a commercial acrylic binder and a minor portion of a commercial UF binder used in industry to bind glass fibers together to make commercial nonwoven glass fiber mats. The resultant dry finished mat had the following properties.

| Basis wt. - 4.8 lbs./100 sq. ft. Thickness (mils) - 58 nominal Loss on ignition (%) - 7 nominal Tensile strength (lbs./3 inch width) - 55 | | | | |
|---|---|---|---|---|
| Tensile after soak in*: | Water Sat. | Ca(OH)2 | Sat. Mg(OH)2 | 1% NaOH |
| 30 days % retention: | 82 | 37 | 84 | 3 |
| 90 days % retention: | 89 | 14 | 74 | 3 |

*All at ambient room temperature.

This data shows that a blend of an acrylic binder and a urea formaldehyde binder produced glass fiber mats having less resistance to calcium hydroxide than the acrylic binder bound mats.

TABLE

Tensile strength retention (%) when exposed to saturated Ca(OH)2 solution.

| Example | Binder | For 30 days* | For 90 days* | 6 hrs.** |
|---|---|---|---|---|
| 1 | MF | 70 | 53 | |
| 2 | 50 UF/50 MF | | | 51 |
| 3 | Acrylic | 44 | 26 | |
| 4 | MF/acrylic | 43 | 11 | |
| 5 | UF/acrylic | 37 | 14 | |

*at 60 degrees C.

The table shows the surprising superiority of the alkaline resistance, as determined by soaking in saturated calcium hydroxide solution at ambient room temperature and at an elevated temperature of 60 deg. C., of glass fiber mats bound together with a melamine formaldehyde binder or binders of a blends of urea formaldehyde and melamine formaldehyde over glass fiber mats in which the binder bonding the fibers together is an acrylic binder or acrylic binders modified with urea formaldehyde binder or melamine formaldehyde binder.

The laminates of the invention are made by forming a wet slurry of a cementitious material against one or more of the glass fiber mats, fabrics and/or scrims of the invention in known processes for making cement boards, backer boards and other cementitious products and then allowing the cementitious material to form hydraulic bonds, cure hydraulically, followed by drying the boards or other shaped laminate products. There are many known processes for making laminates having one or more alkaline cementitious layers, including those disclosed in U.S. Pat. Nos. 6,749,720, 6,995,098, 7,049,251, 7,354,876 and published patent applications disclosed in 2002/0151240 A1, the disclosures being herein incorporated by reference. The laminates can have one or more of the glass fiber mats, fabrics and/or scrim products of the invention, or any combination of these products bonded together with a MF or MF/UF binder adhered to one or more cementitious layers of the laminate.

The glass fiber products of the invention can be coated when desired to produce a smoother surface and to reduce the frequency of "stand-up" fibers (to produce a more user friendly glass fiber product) if desired using any conventional coating process including those processes disclosed in U.S. Pat. Nos. 6,187,697, 6,875,308, 7,426,259, 7,429,544 and published US Pat. Application No. 2003/0129903A1, the disclosures incorporated herein by reference.

Numerous modifications can be made to the preferred embodiments of the invention disclosed in the examples. One can modify the amount of binder, the ratios of UF to MF binders, the basis weight, air permeability and other functional ingredients to achieve the desired properties including tensile strength in the glass fiber products and laminates made therewith. Various known pigments, fillers, and other known additives can be incorporated into the mat by addition to either the whitewater slurry or to the binder for the functions they are known to provide. These modifications that are obvious to those skilled in the art are considered to be part of the present invention and are intended to be included in the invention claimed below.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

The invention claimed is:

1. A fiber mat, fabric, or scrim product having a high resistance to alkaline materials, made by a wet-laid process wherein a wet fibrous interim product is saturated with an aqueous binder blend, said product having a pH of at least 8 and particularly to a saturated calcium hydroxide aqueous solution, said product comprising fibers and/or one or more strands of fibers, a majority of the weight of the fibers in the mat and fabric being glass fibers and/or one or more strands of glass fibers, the fibers bonded together at locations where the fibers and/or the one or more strands of fibers cross each other throughout said product with about 10 to about 35 wt. percent cured binder blend, based on the dry weight of said product when dry, the cured binder blend comprising 1 to about 60 wt. percent of a urea formaldehyde binder ingredient and from about 60 up to 99 wt. percent of a melamine formaldehyde binder ingredient, the total percentages of binder ingredients adding to 100 percent of the binder blend in said product.

2. The product of claim 1 wherein the melamine formaldehyde binder is present in the binder blend in an amount in the range of about 50 to about 99 wt. percent.

3. The product of claim 1 wherein the melamine formaldehyde binder is present in the binder blend in an amount in the range of about 60 to about 97.5 wt. percent.

4. The product of claim 1 wherein the melamine formaldehyde binder is present in the binder blend in an amount in the range of about 65 to about 95 wt. percent.

5. The product of claim 1 wherein the melamine formaldehyde binder is present in the binder blend in an amount in the range of about 70 to about 92.5 wt. percent.

6. A laminate containing a cementitious layer having a pH of at least 8 and a woven or nonwoven fiber mat, fabric, or scrim product, made using a wet-laid process wherein a wet fibrous interim product is saturated with an aqueous binder blend, said product having a cured binder blend in bonding contact with said cementitious layer, said product comprising fibers and/or one or more strands of fibers, a majority of the weight of the fibers in the mat and fabric being glass fibers and/or one or more strands of glass fibers, the fibers being bonded together at locations where the fibers and/or the one or more strands of fibers cross each other throughout said product with about 10 to about 35 wt. percent, based on the dry weight of said product, of said cured binder blend comprising a melamine formaldehyde binder ingredient and an urea formaldehyde binder ingredient, said product having superior alkaline resistance at a pH of at least 8 and to a saturated calcium hydroxide aqueous solution.

7. The laminate of claim 6 wherein the cementitious material has a pH of at least 8.5.

8. The laminate of claim 6 wherein the cementitious material has a pH of at least 9.

9. The laminate of claim 6 wherein the cementitious material has a pH of at least 10.

10. A laminate containing a cementitious layer having a pH of at least 8 and a woven or nonwoven fiber mat, fabric, or scrim product, made using a wet-laid process wherein a wet fibrous interim product is saturated with an aqueous binder blend, said product, in bonding contact with said cementitious layer, said product comprising fibers and/or one or more strands of fibers, a majority of the weight of the fibers in the mat and fabric being glass fibers and/or one or more strands of glass fibers, the fibers bonded together at locations where the fibers and/or the one or more strands of fibers cross each other throughout said product with about 10 to about 35 wt. percent, based on the dry weight of said product when dry, of a cured binder blend comprising 1 to about 60 wt. percent of a urea formaldehyde binder ingredient and from about 60 up to about 99 wt. percent of a melamine formaldehyde binder ingredient, the percentages of the cured binder blend ingredients adding to 100 percent of the cured binder blend in said product, said product having superior alkaline resistance at a pH of at least 8 and to a saturated calcium hydroxide aqueous solution.

11. The laminate of claim 10 wherein the melamine formaldehyde binder is present in the binder blend in an amount in the range of about 55 to about 99 wt. percent.

12. The laminate of claim 10 wherein the melamine formaldehyde binder is present in the binder blend in an amount in the range of about 60 to about 97.5 wt. percent and the pH is at least about 8.5.

13. The laminate of claim 10 wherein the melamine formaldehyde binder is present in the binder blend in an amount in the range of about 65 to about 95 wt. percent and the pH is at least about 9.

14. The laminate of claim 10 wherein the melamine formaldehyde binder is present in the binder blend in an amount in the range of about 70 to about 92.5 wt. percent and the pH is at least about 9.5.

15. The laminate of claim 10 wherein said product has a coating containing a filler and a binder on one surface.

16. The laminate of claim 6 wherein said product has a coating containing a filler and a binder on one exposed surface.

17. The laminate of claim 10 wherein said product has a coating containing a filler and a binder on one exposed surface.

18. A method of making woven or nonwoven mats, fabric or scrim product using a wet-laid process wherein a wet fibrous interim product is saturated with an aqueous binder blend, said product having a high resistance to alkaline materials having a pH of at least 8 and particularly to a saturated calcium hydroxide aqueous solution, comprising arranging fibers to form a fibrous web, bonding and/or coating the fibers together with an aqueous binder blend by saturating the fibrous web with an amount of the aqueous binder blend to produce a cured binder content in the dry product of about 10 to about 35 wt. percent of the dry product, and drying the bindered fibrous web and curing the binder blend to form said product, the fibers comprising chopped and/or continuous fibers, a majority of the weight of the fibers being glass fibers, the binder blend comprising a blend containing urea formaldehyde and melamine formaldehyde with the urea formaldehyde being present in the cured binder in an amount in the range of about 1 to about 60 wt. percent and the melamine formaldehyde binder being present in the cured binder blend in an amount in the range of about 60 to about 99 wt. percent, these percentages adding to 100.

19. A method of making a laminate containing an alkaline material layer having a pH of about 8 or higher comprising bonding said layer to one or more fibrous products made using a wet-laid process wherein a wet fibrous interim product is saturated with an aqueous binder blend, said fibrous products having a high resistance to alkaline materials having a pH of at least 8 and particularly to a saturated calcium hydroxide aqueous solution, the fibrous products comprising one or more of a woven or nonwoven mat and/or a fabric and/or a scrim comprising chopped and/or continuous fibers, a majority of the weight of the fibers being glass fibers and/or strands of glass fibers, the fibers being bonded together throughout said product with a cured dry binder blend comprising about 10 to about 35 wt. percent of the products after drying and curing, the cured binder blend comprising a blend of urea formaldehyde binder and melamine formaldehyde binder wherein the urea formaldehyde binder is present in the cured binder blend in an amount in the range of about 1 to about 60 wt. percent and the melamine formaldehyde binder being present in the blend in an amount in the range of about 60 to about 99 wt. percent, the percentages adding to 100.

\* \* \* \* \*